United States Patent [19]

Kreisler

[11] Patent Number: 4,767,498

[45] Date of Patent: Aug. 30, 1988

[54] METHOD OF REDUCING WASTE VOLUME AND AN APPARATUS THEREFOR

[76] Inventor: Lawrence M. Kreisler, 23 Woodleigh Ct., Holbrook, N.Y. 11741

[21] Appl. No.: 87,396

[22] Filed: Aug. 20, 1987

[51] Int. Cl.⁴ .......................... B01D 1/16; B01D 19/00
[52] U.S. Cl. ........................ 159/47.3; 159/3; 159/16.1; 159/48.1; 159/901; 203/39; 203/49; 203/90; 202/201; 202/236; 261/108; 261/118; 210/805; 210/197; 354/297; 55/53
[58] Field of Search ................ 159/47.3, 48.1, 3, 16.1, 159/901; 203/14, 49, 90, 39; 202/236, 201; 55/53, 196; 261/108, 118; 210/804, 805, 197, 257.1; 354/324, 325, 297; 204/239

[56] References Cited

U.S. PATENT DOCUMENTS

| | | | |
|---|---|---|---|
| 2,156,293 | 5/1939 | Kaufman | 55/196 |
| 3,920,505 | 11/1975 | Helleur | 159/47.3 |
| 3,926,927 | 12/1975 | Stookey | 159/48.1 |
| 3,979,220 | 9/1976 | Ishiyama et al. | 204/239 |
| 3,995,298 | 11/1976 | Vandeputte et al. | 354/324 |
| 4,039,451 | 8/1977 | Smith | 210/197 |
| 4,094,783 | 6/1978 | Jackson | 210/197 |
| 4,104,167 | 8/1978 | Besik | 210/257.1 |
| 4,388,090 | 6/1983 | Streeter | 261/118 |
| 4,466,722 | 8/1984 | Staude | 354/324 |
| 4,534,828 | 8/1985 | Erickson et al. | 203/49 |
| 4,624,686 | 11/1986 | Andrieux et al. | 55/196 |
| 4,687,494 | 8/1987 | Escobal | 55/53 |

FOREIGN PATENT DOCUMENTS 0059449 9/1982 European Pat. Off. ........... 261/108

Primary Examiner—David L. Lacey
Assistant Examiner—V. Manoharan

[57] ABSTRACT

Photographic waste solution is treated by a method which comprises contacting the waste solution with air, in an especially designed treatment vessel, at a solution temperature of from about 120° F. to about 140° F. The air thus becomes supersaturated with the liquid in the waste, and the waste solution is thus concentrated to form a waste slurry which is transferred out into a waste storage vessel. The supersaturated air which is virtually free from waste is discharged to the atmosphere. The method is carried out in an especially constructed apparatus comprising a uniquely designed treatment vessel.

15 Claims, 3 Drawing Sheets

METHOD OF REDUCING WASTE VOLUME AND AN APPARATUS THEREFOR

FIELD OF THE INVENTION

This invention relates generally to the treatment of liquid wastes and is particularly related to a method of reducing the volume of hazardous liquid wastes. In one specific aspect, the present invention is concerned with a method for the reduction of hazardous waste volumes, particularly water-based liquid wastes generated during photographic and other similar processes and operations. In another aspect, this invention provides an apparatus for the treatment and reduction of such wastes so as to minimize the amount of hazardous substances which are discharged to the environment.

BACKGROUND OF THE INVENTION

The treatment and handling of hazardous water-based wastes are matters of paramount concern to environmentalists and residents of many communities. The old practice of simply dumping wastes in rivers and streams is no longer tolerable. Both the federal government and local authorities in recent years have enacted rules and regulations designed to prevent pollution of our environment in order to protect residents of various communities from harmful exposure to hazardous substances generated from some industrial operations. In response to such regulations, and to alleviate the concerns of the residents, most industries have demonstrated concern with waste disposal problems and practices. Some industries have directed their efforts to maximizing the efficiency of their processes and operations so as to minimize the waste discharge to the atmosphere. Others have resorted to the treatment of the wastes, which in some cases are voluminous, in order to comply with governmental and local regulations, all at significant added costs to the manufacturers, and ultimately, the consumers.

One type of waste which is generated in large volumes is the waste produced during photographic processes and similar operations. These wastes are generated by numerous institutions and photographic processing plants and developers. The prevailing current practice of disposing such wastes is to charge them into 55-gallon waste drums as they are generated, and as each drum is filled with waste, haul the drum away to some waste dump site where the waste is simply placed in a landfill. The waste treatment methods which are now available for such wastes are obviously unsatisfactory, and in fact hazardous, since they result in significant environmental pollution. This is neither satisfactory from regulatory point of view, nor healthy or acceptable to environmentalists and community residents. Therefore, there is a dire need for a method for disposal or reduction of such wastes and eliminating or reducing environmental pollution.

Accordingly, it is an object of this invention to provide a method for the treatment of wastes in order to virtually eliminate or effectively reduce environmental pollution.

It is also an object of this invention to provide a method of treatment of wastes whereby the waste volume is substantially reduced so as to minimize the amount of waste which must be dumped.

It is a further object of the present invention to treat large volumes of wastes in order to reduce the amount of waste without harmful discharge of hazardous substances to the environment.

It is still another object of this invention to provide a method of treatment of wastes generated as a result of photographic and similar operations whereby the waste volume may be reduced by as much as about 90 percent without harmful discharge of hazardous substances to the environment.

It is yet a further object of the present invention to provide an apparatus which is uniquely designed and particularly suited for treatment of wastes, especially photographic wastes, so as to substantially reduce the volume of waste to be dumped, without harmful discharge of hazardous substances to the environment.

The foregoing and other objects, features and advantages of the present invention will be appreciated from the following detailed description of the invention with further reference to the accompanying drawings.

SUMMARY OF THE INVENTION

In accordance with the present invention a method and a apparatus are provided for the treatment and reduction of wastes, particularly wastes generated as a result of photographic processes and similar operations. The waste solution is charged into a waste treatment vessel while maintaining the solution at a temperature of from about 120° F. to about 140° F. The waste solution is transferred from the treatment vessel externally and reintroduced to the top of the vessel where it is sprayed across a sandblasted perforated plate disposed above the level of the waste solution, near the top of the treatment vessel. Simultaneously, air at ambient temperature is introduced into the treatment vessel and is passed across the liquid on top of the perforated plate so as to remove moisture from the solution. The air, which will become supersaturated is vented through an exhaust duct located at the top of the treatment vessel. The waste solution on the perforated plate becomes more concentrated as its moisture is removed, and drips back into the treatment vessel through the perforations in the perforated plate. The concentrated waste solution in the form of a slurry is removed from the bottom of the treatment vessel which is slanted to permit gravity flow of the slurry and to facilitate removal thereof from the treatment vessel. The waste slurry is pumped into a waste storage drum until the drum is full.

The present invention also contemplates providing a unique apparatus and system adapted for carrying out the method of this invention.

BRIEF DESCRIPTION OF THE DRAWINGS

In the drawings, wherein like reference numerals designate like parts.

DETAILED DESCRIPTION OF THE INVENTION

Figure 1:
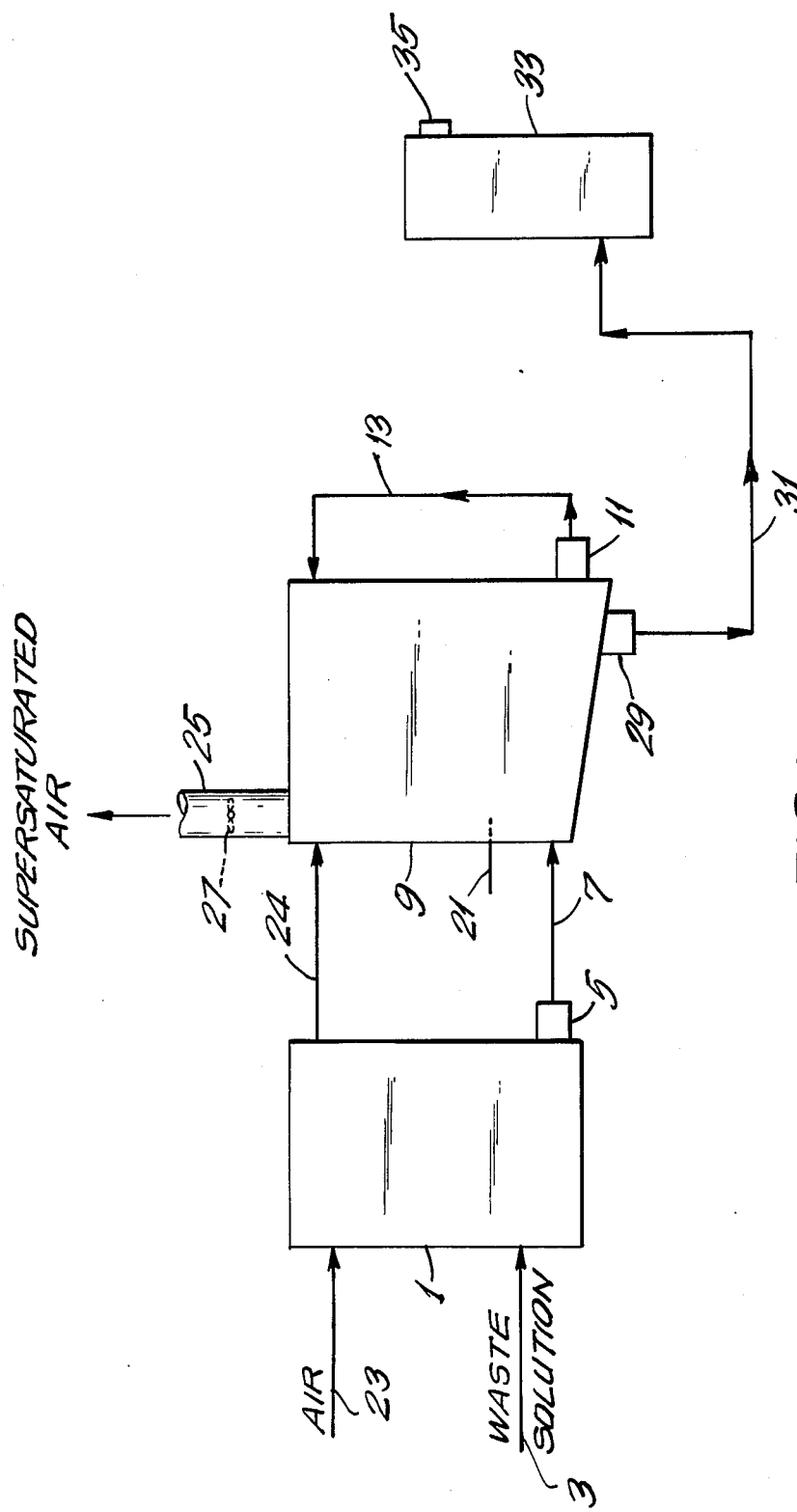
FIG. 1 is a schematic flow diagram illustrating the method of this invention.

As it was previously mentioned, the liquid waste from the photographic processing operation is charged into a 55-gallon waste drum until the drum is filled. In order to treat the waste and reduce its volume, these drums are hauled to the processing site of the present invention where the waste solution is charged to the holding vessel 1 shown in FIG. 1. As a matter of safety and precaution, the waste solution is pumped from the waste drum via an external pump (not shown) and is introduced into the holding vessel 1 through the waste solution line 3.

The holding vessel is equipped with two magnetic read switches; one is a low level switch and the other is a high level switch. The low level switch is normally open and closes when the waste solution rises to that level. The high level switch is normally closed and opens when the waste solution rises to the high level. Once there is sufficient solution in the holding vessel 1 to close the low level switch, a transfer pump 5 begins to pump waste solution from the holding vessel 1 through the transfer line 7 into a waste solution treatment vessel 9. Transfer pump 5 is a submersible pump and is normally disposed within the holding vessel 1.

The treatment vessel 9 is also equipped with two magnetic read switches; a low level switch 10a and a high level switch 10b. The low level switch 10a is normally open and closes when the waste solution in the treatment vessel rises to that level. As long as the waste solution in the treatment vessel 9 is below the low level switch, the heating unit and circulation unit, both to be hereinafter described, will not function. As the solution rises in this vessel, the high level switch 10b, which is normally closed, will open once the solution reaches that level. While the high level switch is in the open position, no solution is transferred from the transfer pump 5. Once this switch closes, after a predetermined time interval, the transfer pump begins to transfer waste solution, provided that the low level switch in the holding vessel is closed. Once the low level switch is closed, liquid will be circulated through an externally located pump 11.

It can be noted that the magnetic read switches control the sequence of solution transfer from the holding vessel 1 to the treatment vessel 9 and the circulation of the waste solution within the treatment vessel 9. The operation of these switches and pumps are programmed and controlled by a programmable control and are monitored by the control panel such as that shown in FIG. 4 to be further described in detail.

The circulation pump 11 transfers the waste solution from the treatment vessel 9 through the circulation line 13 which introduces the solution back into the treatment vessel 9, above a perforated plate 15 having a plurality of perforations 16 (see FIGS. 2 and 3), and is supported by the brackets 18a and 18b. The perforated plate 15 is preferably made of polypropylene and is sandblasted to impart a rough texture thereto in order to increase its surface area and provide larger air-to-liquid surface contact, the reason for which will become clearer from the ensuing description. At the point of re-entry to the treatment vessel 11, above the perforated plate 15, the circulation line 13 is provided with a spray head 17 which sprays the waste solution onto and across the perforated plate 15 and forms a liquid layer thereon. Meanwhile, a heater 19 located within the treatment vessel 9 serves to maintain the waste solution in the treatment vessel at a temperature of from about 120° F. to about 140° F., preferably at about 130° F. for photographic waste solutions. A thermocouple 21 serves to check the temperature of the waste solution in the treatment vessel. If the temperature exceeds the preset temperature level, the operation of the heater will be automatically interrupted.

Ambient air is introduced into the holding vessel 1 through line 23, flows through the holding vessel and picks up some of the moisture from the waste solution. This moisture-ladden air is caused to flow into the treatment vessel 9 over a film of waste solution which has been sprayed over the perforated plate 15. After contacting the liquid film over this perforated plate, the air is exhausted to the atmosphere through the exhaust duct 25 which is provided with an exhaust fan 27. Simultaneously, the waste solution will drip through the perforations 16 in the perforated plate 15 back into the treatment vessel 9, wherefrom the solution is pumped by the circulation pump 11 through circulation line 13, the spray head 17 onto the perforated plate 15 where it is contacted by the air flowing across the liquid film formed on this plate. By circulation of the waste solution and proper flow of air as aforesaid, the method of this invention provides exhausted air which is supersaturated and virtually free from waste materials. In fact, most of the water in the waste solution will be carried out into the atmosphere by the supersaturated air stream hence resulting in concentration of the waste solution into a slurry in the treatment vessel 9.

Figure 2:
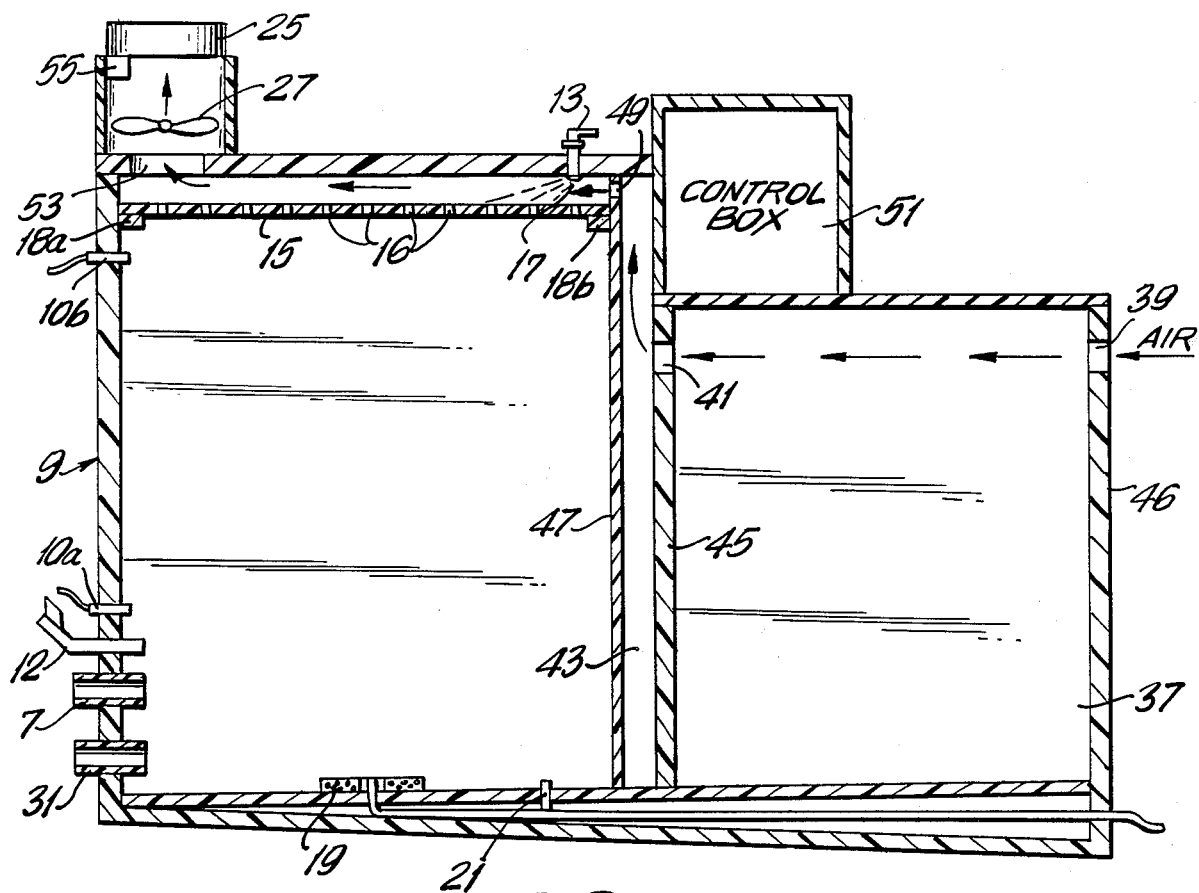
FIG. 2 is a view, partly in cross section, of the vessel used for carrying out the treatment of the waste solution in accordance with the present invention.
Figure 3:
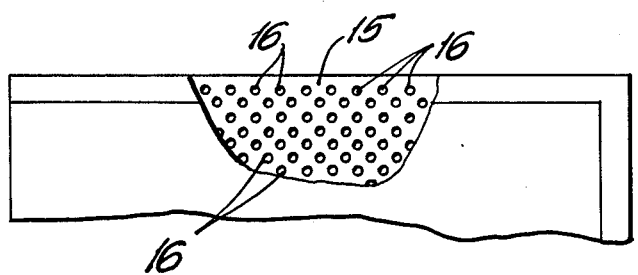
FIG. 3 is a top view, partly broken away, of the perforated plate used near the top of the vessel shown in FIG. 2.

As shown in FIGS. 1 and 2, the treatment vessel 9 has an inclined bottom which is designed to facilitate gravity flow of the waste slurry toward the slurry removal pump 29. This pump transfers the concentrated waste solution (slurry) from the treatment vessel 9 through the slurry transfer line 31 into a waste disposal drum 33. This drum is equipped with a high level control 35 which indicates when the drum is full, in which case the operation is temporarily interrupted to permit changing of the waste drum.

The treatment vessel 9 and its principal associated elements are shown in more detail in FIG. 2. As shown therein, the treatment vessel 9 is equipped with a low level read switch 10a and a high level read switch 10b. Similar read switches are provided (but not shown) for the holding vessel 1. A flow sensor 12 senses the flow into the treatment vessel.

Air from the holding vessel 1 enters the plenum chamber 37 through one or more slots in the wall of the plenum chamber, such as through the slot 39 in the chamber wall 46. The air from the plenum chamber enters the air channel 43 defined by the opposed parallel walls 45 and 47 of the treatment vessel 9. The air enters through the slot 41 and after passing through the channel 43, enters the space between the perforated plate 15 and the top of the treatment vessel 9, through the slot 49, flows across the perforated plate 15 over the liquid layer formed on this plate by spraying the waste solution through the header 17 at the top of circulation line 13. After flowing across and contacting the liquid waste layer on the perforated plate 15, air leaves the treatment vessel 9, as supersaturated air, through the slot 53 and into exhaust duct 25 fanned by the exhaust fan 27. The concentrated waste solution drops back into the treatment vessel 9 through the perforations 16 and the concentrated waste solution is removed from this vessel by transfer pump 29 and line 31 as heretofore described in connection with FIG. 1.

A control box 51 serving as a programming computer for the entire system is located on the plenum chamber. This programming computer is illustrated separately in FIG. 4 and displays the control functions and operating functions of the system.

Figure 4:
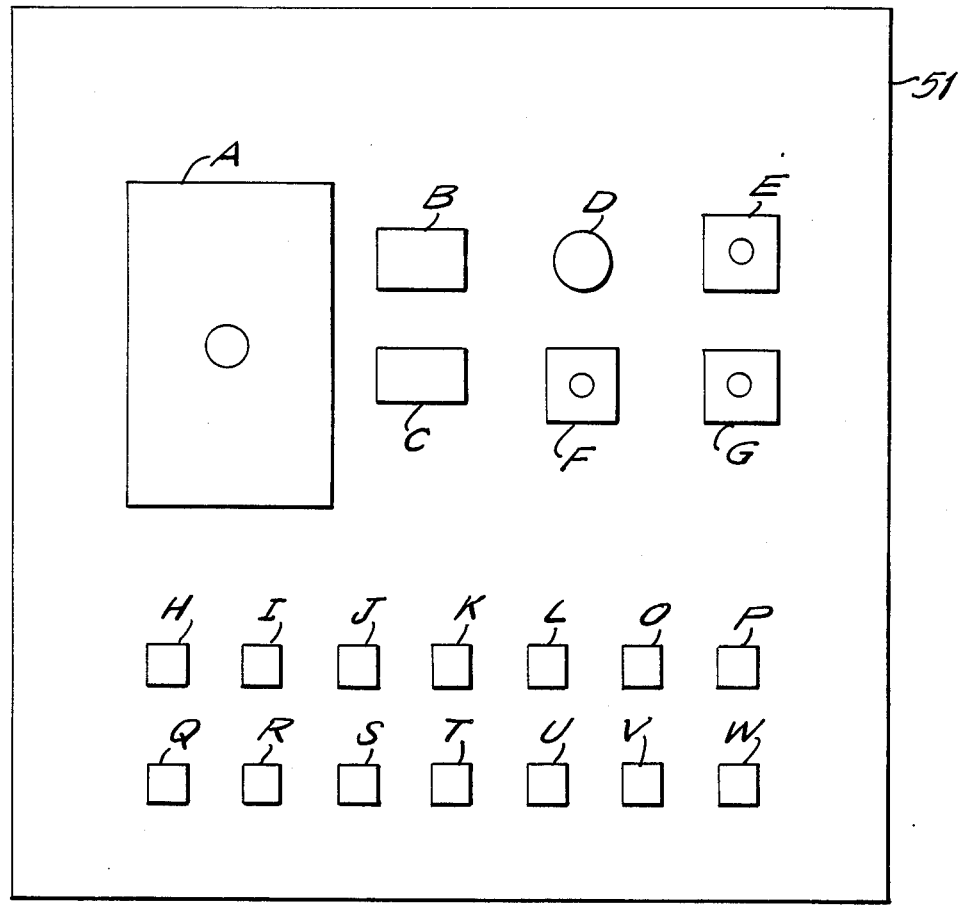
FIG. 4 is a front elevational view of the control board which controls the functions of the system of the present invention.

In operation, the system power switch E is turned on (see FIG. 4). This will activate the exhaust fan 27 as indicated by the switch S on the panel of the control box. If no positive air flow is sensed by the air flow sensor 55 (see FIG. 2), then the switch 0 will turn on signifying exhaust system failure. The system will then be placed in a standby mode as indicated by the indicator V and after the malfunction has been corrected, the reset switch G is activated to start the operation again. Once the flow sensor 55 senses positive air flow, the alarm silencing button F is depressed and the waste solution is pumped from the holding vessel 1 into the treatment vessel 9. This solution transfer takes place so long as the solution level in the holding vessel is not below the low level switch, the treatment tank is not above the high level switch and the waste drum 33 is not full. Indicator lights H, I, J and K on the control board indicate the level of the solutions at the holding vessel and the treatment vessel. When sufficient waste solution has been transferred to the treatment vessel 9, as indicated by the low level switch I, the system circulation pump 11 will be activated and the waste solution will be transferred through transfer line 13 and sprayed across the perforated plate 15 as hereinbefore described. Switches T and R indicate that the transfer pump 11 and the head spray 17 are functioning properly. If no flow is sensed by the flow sensor, the alarm light W will illuminate and the audible alarm C buzzes until the malfunction is corrected. When the flow sensor detects positive flow, the heater 19 is activated. Heating system failure is also indicated by the illumination of the indicator P, and when the heating system is on, the indicator U will light up on the control board.

As it was previously mentioned, the heating is preset to maintain the required temperature in the treatment vessel 9. A thermocouple 21 will sense temperatures exceeding the preset temperature and will sound the audible alarm C in the event that the thermocouple senses such higher temperatures.

As the waste solution is concentrated, the waste slurry is removed from the treatment vessel 9 and pumped into the waste drum 33 as aforesaid. Indicator Q on the control board 51 signifies the condition of the waste transfer pump 29 but when the waste drum is full, the indicator 6 will light at which time the operation must be temporarily interrupted to replace the waste drum.

The heating and control unit A on the control board serves to control the heating system and to provide the heat required to maintain the treatment tank at the desired temperature.

An hour counter B on the control board indicates the time the unit has been on or off and a safety fuse D provides for interruption of the operation in case of current overload or other malfunction of the system.

It has been found that when photographic wastes, for example, are treated by the method of this invention, the waste volume can be drastically reduced. In most instances, a waste volume reduction of as much as about 80 to about 85 percent can be realized by the practice of this invention. Meanwhile, the air vented to the atmosphere from this process is supersaturated with moisture and virtually free of hazardous substances.

As it was previously mentioned, the perforated plate 15 is made of a high performance plastic. Polypropylene has been found to be particularly well suited as the material of construction for this plate as well as for the holding vessel, treatment vessels and most other accessories of the system. Other materials of construction may be used provided they can withstand the chemicals in the waste solution.

The entire operation of the present invention is programmed and electronically controlled, however, the electrical circuitries of the system are not, per se, part of the present invention. The electronic circuitries can be designed and implemented based on the disclosure and guidelines provided herein.

It can be appreciated from the foregoing detailed description that the method of this invention, as well as the apparatus employed to carry out this method, can be changed or modified without departing from the principles set forth herein. Such changes and/or modifications are nevertheless within the scope of this invention.

What is claimed is:

1. A method of reducing the volume of waste in a waste solution which comprises:
   (a) Introducing said waste solution into a waste treatment vessel;
   (b) maintaining said waste solution at a temperature of from about 120° F. to about 140° F. in said waste treatment vessel;
   (c) spraying said waste solution across a perforated plate disposed above the level of the waste solution in said waste treatment vessel;
   (d) passing air across said perforated plate in said treatment vessel to contact said waste solution and thereby become supersaturated with the liquid in said solution;
   (e) permitting said waste solution to drip through said perforated plate back into said treatment vessel while discharging the supersaturated air from said vessel, and
   (f) withdrawing a concentrated waste solution as a slurry from said treatment vessel.

2. A method as in claim 1 wherein said waste solution is a waste solution generated from photographic operations.

3. A method as in claim 2 wherein said waste solution is circulated through said treatment vessel.

4. A method of claim 1 wherein said waste solution is first introduced into a holding vessel prior to introduction of said solution into said treatment vessel.

5. A method as in claim 4 wherein said waste solution is a waste solution generated from photographic operations.

6. A method as in claim 5 wherein air is first passed through said holding vessel and thereafter passed across said perforated plate in said treatment vessel.

7. A method as in claim 6 wherein said waste solution is circulated through said treatment vessel.

8. A method as in claim 5 wherein said waste solution is circulated through said treatment vessel.

9. A method as in claim 4 wherein air is first passed through said holding vessel and thereafter passed across said perforated plate in said treatment vessel.

10. A method as in claim 9 wherein said waste solution is circulated through said treatment vessel.

11. A method as in claim 4 wherein said waste solution is circulated through said treatment vessel.

12. A method as in claim 1 wherein said waste solution is circulated through said treatment vessel.

13. An apparatus for reducing waste contained in a waste solution said apparatus comprising a treatment vessel having a substantially horizontal top, an inclined bottom, two spaced parallel walls defining an air flow channel on one side of said vessel and an opposed parallel wall on the other side of said vessel; a perforated plate disposed below the top of said vessel and defining a horizontal channel therewith; means for spraying waste solution across said perforated plate; means for maintaining said waste solution at a temperature of from about 120° F. to about 140° F. in said treatment vessel, entrance port for introducing air to flow across said perforated plate; exit port at the top of said vessel for venting supersaturated air to the atmosphere, and means for removing concentrated waste solution from the bottom of said treatment vessel.

14. An apparatus as in claim 13 further including a holding vessel upstream of said treatment vessel for holding the waste solution; means for transferring the waste solution from said holding vessel to said treatment vessel; a waste storage vessel downstream of said treatment vessel and means for transferring concentrated waste solution from said treatment vessel to said storage waste vessel.

15. An apparatus as in claim 13 wherein said treatment vessel includes a circulation means for circulating said waste solution through said treatment vessel, said circulation means comprising a pump, a transfer line having one end connected to said pump for transferring the waste solution, a second end terminating at said horizontal channel at top of said treatment vessel, and said spray means being connected to said second end of said transfer line.

* * * * *